(12) United States Patent
Mendelow et al.

(10) Patent No.: US 8,601,252 B2
(45) Date of Patent: *Dec. 3, 2013

(54) METHOD AND SYSTEM FOR AUTOMATICALLY RESTARTING AN INFORMATION HANDLING SYSTEM TO RESTORE SYSTEM CONFIGURATION AFTER DISORDERLY SHUTDOWN INDICATED BY SETTING A LATCH

(71) Applicant: Dell Products, LP, Round Rock, TX (US)

(72) Inventors: Matthew B. Mendelow, Austin, TX (US); Todd W. Schlottman, Round Rock, TX (US); Joseph N. Alperin, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,614

(22) Filed: Nov. 12, 2012

(65) Prior Publication Data

US 2013/0073841 A1 Mar. 21, 2013

Related U.S. Application Data

(63) Continuation of application No. 12/206,525, filed on Sep. 8, 2008, now Pat. No. 8,335,913.

(51) Int. Cl.
*G06F 9/00* (2006.01)
*G06F 15/177* (2006.01)

(52) U.S. Cl.
USPC ................................. 713/2; 714/24

(58) Field of Classification Search
USPC ................................. 713/2; 714/24
See application file for complete search history.

(56) References Cited

U.S. PATENT DOCUMENTS

| | | | |
|---|---|---|---|
| 5,860,001 A | 1/1999 | Cromer et al. | |
| 6,591,368 B1 | 7/2003 | Ryu | |
| 6,622,192 B2 | 9/2003 | Chou et al. | |
| 6,717,530 B1 * | 4/2004 | Schmidt et al. | 340/870.17 |
| 6,862,695 B2 | 3/2005 | Lin | |
| 7,017,085 B2 | 3/2006 | Braun | |
| 7,818,621 B2 | 10/2010 | Childress et al. | |

(Continued)

OTHER PUBLICATIONS

Wikipedia; "Wake-on LAN"; http://en.wikipedia.org/wiki/Wake-on-LAN; Sep. 8, 2008 11:17 AM; 7 pages.

(Continued)

*Primary Examiner* — Thomas Lee
*Assistant Examiner* — Xuxing Chen
(74) *Attorney, Agent, or Firm* — Larson Newman, LLP (57) ABSTRACT

A restart controller for an information handling system includes a first latch and a second latch. An output of the second latch is coupled to an input of the first latch. The restart controller is configured to detect that the information handling system has been shut down responsive to a first disorderly shutdown, and in response to detecting the shut down, to set the first latch, initiate a first startup of the information handling system to enable a remote wake mechanism of a chipset of the information handling system, and determine, at the second latch, that a basic input/output system (BIOS) of the information handling system is operational. In response to determining that the BIOS is operational, The restart controller is further configured to initiate an orderly shutdown of the information handling system, and clear the first latch.

20 Claims, 4 Drawing Sheets

(56) References Cited

U.S. PATENT DOCUMENTS

| | | |
|---|---|---|
| 2001/0037475 A1 | 11/2001 | Bradshaw et al. |
| 2001/0039612 A1 | 11/2001 | Lee |
| 2004/0044890 A1 | 3/2004 | Lim et al. |
| 2004/0193928 A1 | 9/2004 | Shuto et al. |
| 2006/0123258 A1 | 6/2006 | Westerinen et al. |
| 2006/0179353 A1 | 8/2006 | Kawata |
| 2007/0220328 A1 | 9/2007 | Liu et al. |
| 2007/0283187 A1 | 12/2007 | Dunstan et al. |
| 2008/0209235 A1* | 8/2008 | Chen et al. ............... 713/300 |
| 2010/0064128 A1 | 3/2010 | Mendelow et al. |

OTHER PUBLICATIONS

Hewlett-Packard Corporation et al., "Advanced Configuration and Power Interface Specification" Revision 3.0b, Oct. 10, 2006, pp. 1-417.

* cited by examiner

METHOD AND SYSTEM FOR AUTOMATICALLY RESTARTING AN INFORMATION HANDLING SYSTEM TO RESTORE SYSTEM CONFIGURATION AFTER DISORDERLY SHUTDOWN INDICATED BY SETTING A LATCH

CROSS REFERENCE TO RELATED APPLICATIONS

This application is a continuation of U.S. patent application Ser. No. 12/206,525, entitled "Method and System for Restoring System Configuration after Disorderly Shutdown," filed on Sep. 8, 2008, the disclosure of which is hereby expressly incorporated by reference in its entirety.

FIELD OF THE DISCLOSURE

This disclosure relates generally to information handling systems, and more particularly to system state configuration in information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Many information handling systems utilize a basic input/output system (BIOS) to perform system configuration operations. One example of a configurable option is the enabling and disabling of a remote wake mechanism, such as wake-on-local-area-network (WOL) or wake-on-ring (WOR), to remotely startup, or "wake up", the information handling system from a low-power or powered-down state. The remote wake mechanism often is implemented at the motherboard of the information handling system and requires configuration by the BIOS. In such systems, the BIOS typically arms the remote wake mechanism as part of an orderly shutdown so that the information handling system is configured for remote management once shut down. However, the information system also typically implements a power button that a user can manipulate to initiate a disorderly shutdown whereby the information handling system is immediately shut down via hardware without permitting proper shutdown configuration by the BIOS and other software components of the information handling system. To illustrate, the input/output controller hub (ICH) of the chipset of the information handling system often clears all of its power management event (PME) enable flags, which, consequently, prevents an external event from turning on the information handling system. As such, remote management of the information handling system typically is prevented following a disorderly shutdown or other disorderly shutdown.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

FIGS. 1-4 illustrate example techniques for recovering system configuration settings, such as remote management, of an information handling system following a disorderly shutdown. The term "disorderly shutdown", as used herein, refers to a hardware-initiated shutdown that is performed substantially independent of software control or coordination. A restart controller detects a disorderly shutdown of the information handling system and, in response, sets a disorderly shutdown flag and restarts the information handling system. During the restart, the basic input/output system (BIOS) checks the disorderly shutdown flag as part of its power-on housekeeping. In response to determining the disorderly shutdown flag has been set, the BIOS reconfigures the power management scheme of the information handling system so as to enable one or more remote wake mechanisms, such as wake-on-LAN or wake-on-ring. The BIOS then performs an orderly shutdown of the information handling system to place the information handling system in a low-power state, from which the information handling system can be awoken via the remote wake mechanism.

Figure 1:
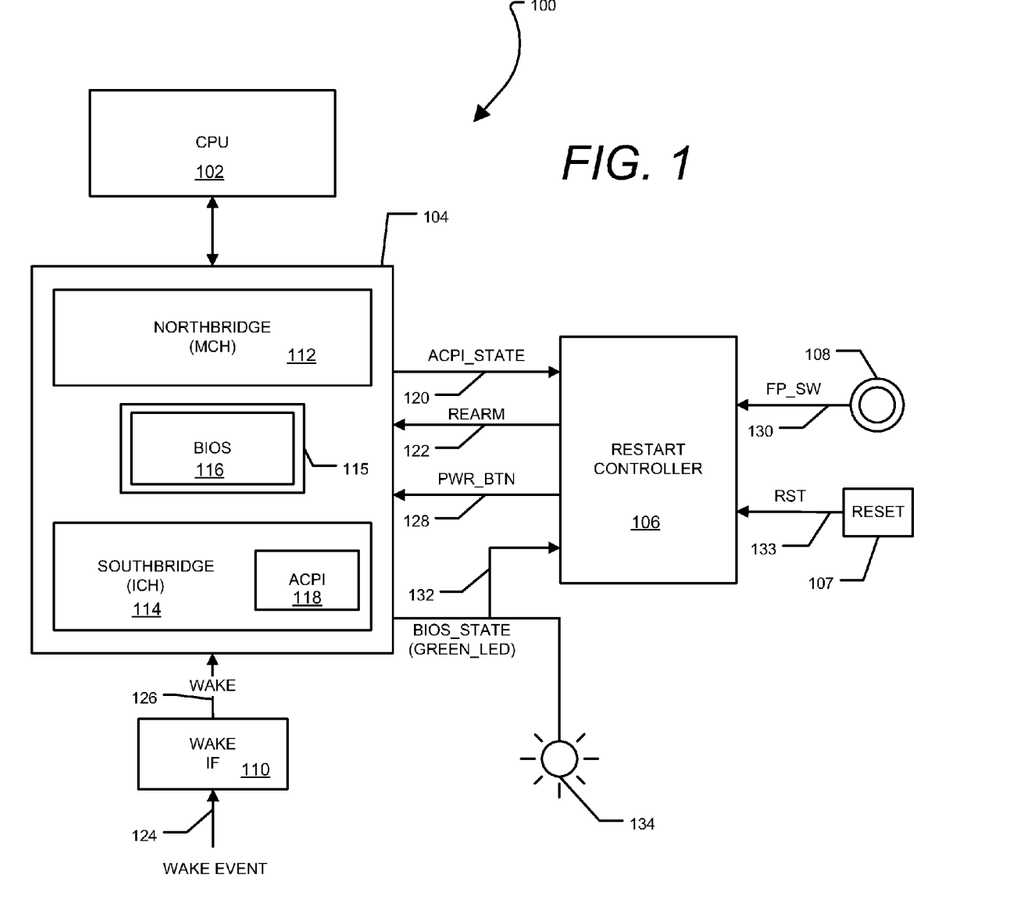
FIG. 1 illustrates a block diagram of an example information handling system utilizing a restart controller to enable remote wake configuration following a disorderly shut down according to one aspect of the disclosure.

FIG. 1 illustrates an example information handling system 100 in accordance with at least one embodiment of the present disclosure. In the depicted example, the information handling system 100 includes one or more central processing units (CPUs) 102, a chipset 104, a restart controller 106, reset logic 107, a user-manipulable power button 108 (e.g., a front-panel switch), and one or more remote wake interfaces 110. The chipset 104 typically includes a northbridge 112 (also referred to as a memory controller hub (MCH), a southbridge 114 (also referred to as an I/O controller hub (ICH)), and a non-volatile memory 115 (e.g., a read-only memory (ROM) or flash memory) to store a set of instructions representative of a basic input/output system (BIOS) 116 used to control the startup, initialization, and shutdown processes for the information handling system 100, whereby the set of instructions is loaded from the non-volatile memory 115 and executed by the CPU 102 to manipulate the CPU 102 to perform the functionality ascribed to the BIOS 116 as described herein.

In at least one embodiment, the southbridge 114 implements a power management controller 118 to facilitate configuration of the power management state of the information handling system 100 and to process power management triggers, such as remote wake events. For ease of discussion, the power management controller 118 is described in the example context of the Advanced Configuration and Power Interface (ACPI) specification and thus the power management controller 118 is referred to herein as the ACPI controller 118. However, alternate power management schemes can be implemented using the guidelines provided herein. Further, although illustrated as part of the southbridge 114 in the embodiment of FIG. 1, in alternate embodiments the ACPI controller 118 can be implemented at least in part as BIOS instructions (executed by the CPU 102).

The ACPI specification defines seven global states: G0 (or S0)—the normal working state of the information handling system; G1 (S1-S4)—the various "sleeping" states of reduced power consumption, including power-on-standby (POS), suspend to random access memory (STR), and hibernation; G2 (S5)—or "soft off"—whereby many of the components are not powered but the information handling system remains capable of remote management (remote wake); and G3—or "mechanical off"—whereby the information handling system is not powered and requires a full boot process to bring the information handling system into state G0 (S0). The ACPI controller 118 is configured to monitor the operation of the information handling system 100 and the user's interaction with the information handling system 100 and configure the information handling system 100 into a corresponding one of these states. During operation, the ACPI controller 118 provides signaling (collectively referred to herein as "ACPI_STATE signals 120") indicative of the power management state of the information handling system 100. Further, the ACPI controller 118 implements one or more Power Management Event (PME) flags, one or more of which are remote wake flags that enable and disable a corresponding remote wake mechanism. These PME flags are stored as latched values internally in the chipset 104. The ACPI controller 118, in one embodiment, is configured to set this remote wake flag, thereby rearming the remote wake mechanism of the chipset 104, in response to an assertion of a REARM signal 122 provided to the BIOS 116 via, e.g., a general purpose input (GPI) pin of the chipset 104. As described in greater detail below, the REARM signal 122 serves as a disable flag to signal whether a disorderly shutdown has occurred.

The remote wake event that triggers the remote wake mechanism of the chipset 104 (when properly configured for remote management via the PWM flags) can include, for example, a wake-on-LAN (WOL) event, a wake-on-ring (WOR) event, and the like. Accordingly, the remote wake interface 110 can include, for example, a LAN network interface, a modem interface, and the like. In operation, the remote wake interface 110 identifies a remote wake event (e.g., a "magic packet" for a WOL event), in response to which the remote wake interface 110 provides an asserted WAKE signal 126 to the chipset 114. The ACPI controller 118, the BIOS 116, and the chipset 114, if enabled for remote mechanism, respond to the asserted WAKE signal 126 by initiating the startup process for the information handling system 100.

In addition to facilitating I/O with various components of the information handling system 100 and facilitating remote management via the ACPI controller 118 and BIOS 116, the chipset 104 (e.g., the southbridge 114), in one embodiment, is configured to initiate and process a hardware-initiated shutdown of the information handling system 100 in response to the assertion of a PWR_BTN signal 128. This hardware shutdown is independent of software control and thus serves as a disorderly shutdown regardless of the operational state of the operating system (OS) and other software components of the information handling system 100.

The power button 108 is a user-manipulated button or other switch located on, for example, a front panel of the information handling system 100 so as to enable a user to perform an orderly startup or shutdown of the information handling system 100, as well as to initiate a disorderly shutdown of the information handling system 100 in the event that the information handling system 100 becomes non-responsive or the user otherwise intends to shut down the information handling system 100 without permitting an orderly software-controlled shutdown process. A user's manipulation of the power button 108 results in the assertion of a FP_SW signal 130, which is passed through the restart controller 106 resulting in the assertion of a PWR_BTN signal 128, whereby the PWR_BTN signal 128 remains asserted for the duration that the power button 108 is engaged. In an alternate embodiment, the assertion of the PWR_BTN signal 128 can be controlled by the assertion of another hardware trigger, such as an assertion of an overtemperature signal or an overvoltage signal.

The restart controller 106 is configured to control the states of the REARM signal 122 and the PWR_BTN signal 128 responsive to the states of the ACPI_STATE 120, the FP_SW signal 130, and a BIOS_STATE signal 132 representative of the operational state of the BIOS 116. Further, the restart controller 106 is reset into an initial configuration, described below, responsive to an assertion of a RST signal 133 by the reset logic 107 responsive to, for example, initial power on of the restart controller 106 that occurs when alternating current (AC) power is supplied to the information handling system 100.

In one embodiment, the BIOS_STATE signal 132 can include a signal provided by the BIOS 116 specifically for the restart controller 106 (e.g., via a general purpose input/output (GPIO) pin) so as to indicate to the restart controller 106 whether the BIOS 116 is operational. In another embodiment, a signal indicative of the BIOS operational state and originally intended for other purposes can also be used by the restart controller 106 to determine the BIOS operational state. To illustrate, some information handling systems utilize a light emitting diode (LED) 134 (e.g., a green LED) to indicate that the information handling system is operating normally (and thus the BIOS is operating normally). Thus, the control signal (GREEN_LED) for this LED 134 can serve a secondary purpose as the BIOS_STATE signal 132.

Through monitoring the state of the power button 108 (via the FP_SW signal 130), the state of the power management scheme (via the ACPI_STATE signals 120), and the state of the BIOS 132 (via BIOS_STATE signal 132), the restart controller 106 is configured to facilitate recovery of the remote wake mechanisms of the information handling system 100 after a disorderly shutdown. While a disorderly shutdown is not detected, the restart controller 106 permits the PWR_BTN signal 128 to be controlled by the power button 108 (via the FP_SW signal 130). However, in response to detecting a disorderly shutdown (via the ACPI_STATE signals 120), the restart controller 120 is configured to initiate a startup of the information handling system 100 (via the PWR_BTN signal 128) so as to enable the BIOS 116 to restore a clean system (e.g., by configuring the PME flags) and then facilitating an orderly shutdown of the information handling system 100 so that the information handling system 100 is placed in a remotely manageable state.

In some instances, a substantial hardware fault may have necessitated the original disorderly shutdown and this hardware fault may prevent normal operation after the restart controller 106 restarts the information handling system 100. Accordingly, in the event that the restart controller 106 determines (via the BIOS_STATE signal 132) that the information handling system 100 was unable to successfully startup after an initial disorderly shutdown so as to enable an orderly shutdown, the restart controller 106 then initiates another disorderly shutdown via the PWR_BTN signal 128 and ceases any further attempts to automatically restart the information handling system 100. This operation ensures that the information handling system 100 is left in the user-intended off state. Likewise, as described below, the restart controller 106 can be configured to latch the state of the REARM signal 122 so as to determine if a disorderly shutdown has already occurred, and if so, ceasing any further attempts to automatically restart the information handling system 100.

Figure 2:
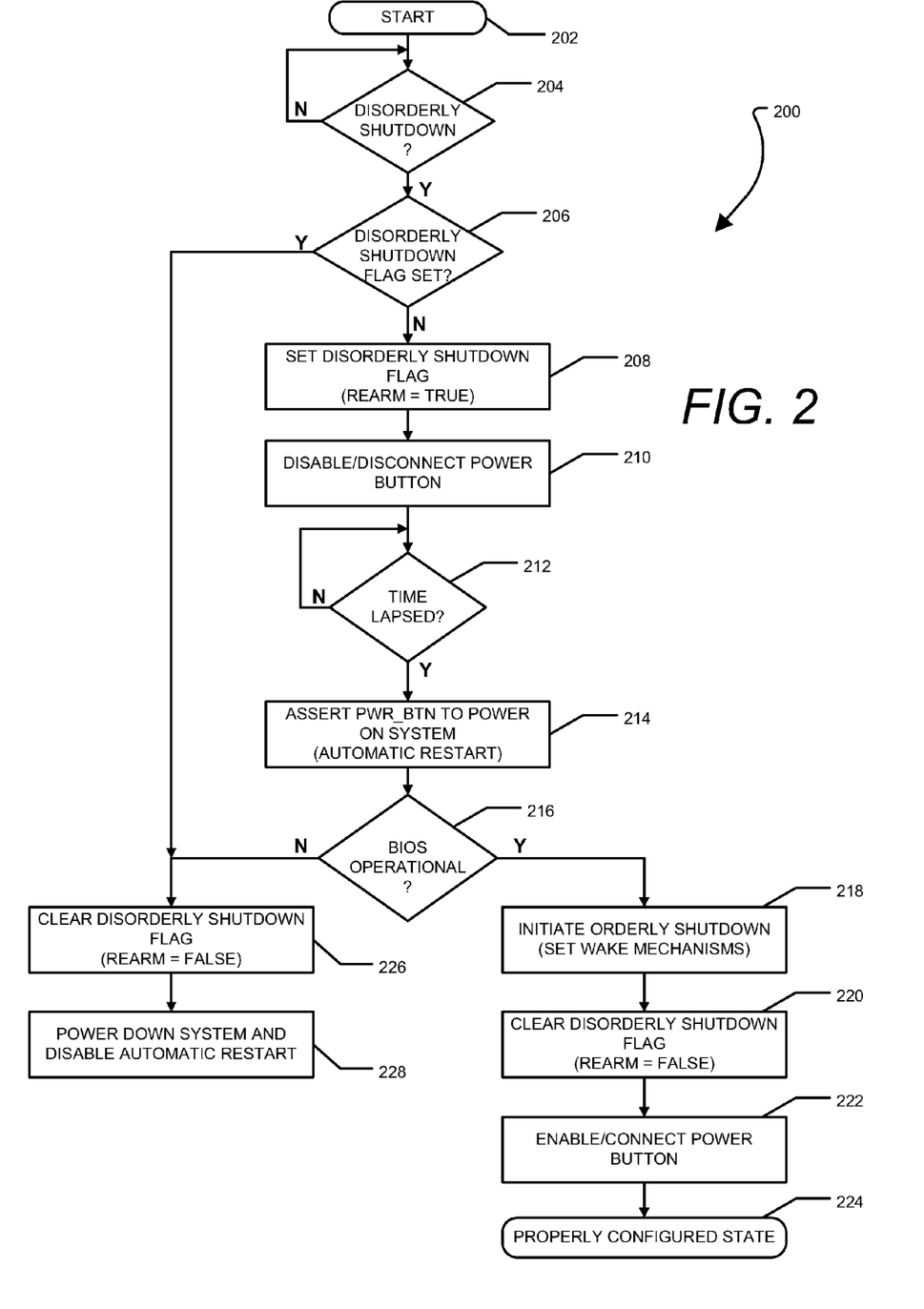
FIG. 2 illustrates a flow diagram of an example method of operation of the information handling system of FIG. 1 according to one aspect of the disclosure.

FIG. 2 illustrates an example method 200 of operation of the information handling system 100 of FIG. 1 with respect to recovery from a disorderly shutdown in accordance with at least one embodiment of the present disclosure. The method 200 initiates at step 202 whereby the information handling system 100 is started up, in response to which the reset logic 107 asserts the RST signal 133 to set the restart controller 106 in an initial state. At block 204, the restart controller 106 monitors the ACPI_STATE signals 120 to determine whether a disorderly shutdown has occurred. To illustrate, during an orderly shutdown the ACPI controller 118 may assert and clear the various signals of the ACPI_STATE signals 120 in a particular order or timing sequence. The method of using the ACPI_STATE signals 102 to distinguish an orderly shutdown from a disorderly shutdown varies based upon the particular chipset 104 implemented in the information handling system 100. Thus, the restart controller 106 can determine that a disorderly shutdown has occurred when the sequence or order of states of the ACPI_STATE signals 120 does not match the expected sequence or order that occurs during an orderly shutdown.

A disorderly shutdown can be initiated by a user when the user engages the power button 108 for a predetermined duration. Alternately, a disorderly shutdown can be initiated by another event, such as assertion of an overtemp signal to indicate an overtemperature condition or an assertion of an overvoltage signal to indicate an overvoltage condition of the information handling system 100, which necessitates an immediate shutdown of the information handling system 100 to limit or prevent damage.

As discussed in greater detail below, the restart controller 106 can be configured to latch the state of the disorderly shutdown flag (i.e., the state of the REARM signal 122) so as to be able to detect whether a disorderly shutdown has already occurred prior to a disorderly shutdown detected at block 204 and thus indicating a hardware fault that is preventing the information handling system 100 from restarting properly. Accordingly, in response to determining there has been a disorderly shutdown, at block 206 the restart controller 106 checks the state of the disorderly shutdown flag (REARM signal 122) to determine whether another disorderly shutdown has already occurred. If so, the method 200 flows to blocks 226 and 228 to initiate a disorderly shutdown of the information handling system 100 and cease any further attempts to automatically restart as described in greater detail below.

In the event that the disorderly shutdown flag is not detected as set at block 206, at block 208 the restart controller 106 sets the disorderly shutdown flag by asserting the REARM signal 122 so as to signal to the BIOS 116 that a disorderly shutdown has occurred. Further, to prevent the user or another stimulus from resetting the information handling system 100 while the disorderly shutdown recovery process is still in progress, at block 210 the restart controller 106 disconnects or otherwise disables the power button 108. At block 212, the restart controller 106 institutes a delay to permit the chipset 104 to propagate the current status of the PWR_BTN signal 128. In one embodiment, the delay is implemented via a resistor-capacitor (RC) circuit. In another embodiment, a timer (e.g., a clock signal-driven counter) can be used to implement the delay. When the delay has lapsed, at block 214 the restart controller 106 initiates a startup of the information handling system 100 (i.e., automatically restarts the information handling system 100) via the chipset 104 by asserting the PWR_BTN signal 128.

In response to the assertion of the PWR_BTN signal 128, the chipset 104 initiates the startup process by loading the BIOS 116 into memory for execution by the CPU 102 at block 216. In the event that the BIOS 116 is properly initiated and operation, the BIOS 116 asserts, via the chipset 104, the BIOS_STATE signal 132. In one embodiment, the BIOS 116 is programmed specifically to provide the BIOS_STATE signal 132 via a GPIO or other output interface specifically for the restart controller 106. In another embodiment, a signal indicative of the proper initiation of the BIOS 116, such as the GREEN_LED signal for the LED 134, is repurposed for additional use by the restart controller 106 as an indicator of the BIOS operational state.

In the event that the BIOS 116 is initiated and operational, at block 218 the BIOS 116 determines that the REARM signal 122 is asserted and thus the BIOS enables the remote wake mechanism of the information handling system 100 and initiates an orderly shutdown. This orderly shutdown process can include the rearming the remote wake mechanisms of the chipset 104 (e.g., by setting the corresponding PME flags), as well as restoring other configuration settings that may have been disrupted by the disorderly shutdown of block 202. Further, at block 220 the restart controller 106 clears the disorderly shutdown flag by clearing the REARM signal 122 and at block 222 the restart controller 106 reconnects or otherwise enables the power button 108 so as to allow a user or other stimulus to subsequently utilize the power button 108 of the information handling system 100. Thus, after the orderly shutdown has completed, the information handling system 100 is placed in a properly configured state (block 224) whereby the information handling system 100 is operating normally (e.g., the information handling system 100 is capable of responding to remote wake events such as a WOL or WOR event).

Returning to blocks 206 or 216, it will be appreciated that a hardware fault or other system failure may have necessitated the disorderly shutdown detected at block 204. This fault may prevent the BIOS 116 from becoming operational following the automatic restart of block 214. As such, further attempts to start up the information handling system 100 may damage one or more components of the information handling system 100. Accordingly, in the event that the disorderly shutdown flag is identified as already asserted at block 206 or in the event that the BIOS 116 fails to initiate and become operational as determined by the restart controller 106 from the BIOS_STATE signal 132, at block 226 the restart controller 106 clears the disorderly shutdown flag by clearing the REARM signal 122 and at block 228 the restart controller 106 asserts the PWR_BTN signal 128 to initiate a disorderly shutdown (and thus initiating another disorderly shutdown) so as to immediately shut down the information handling system 100. The restart controller 106 further configures itself to cease any further attempts to automatically restart the information handling system 100. At this point, the information handling system 100 likely will require diagnosis and repair by the user or a technician.

Figure 3:
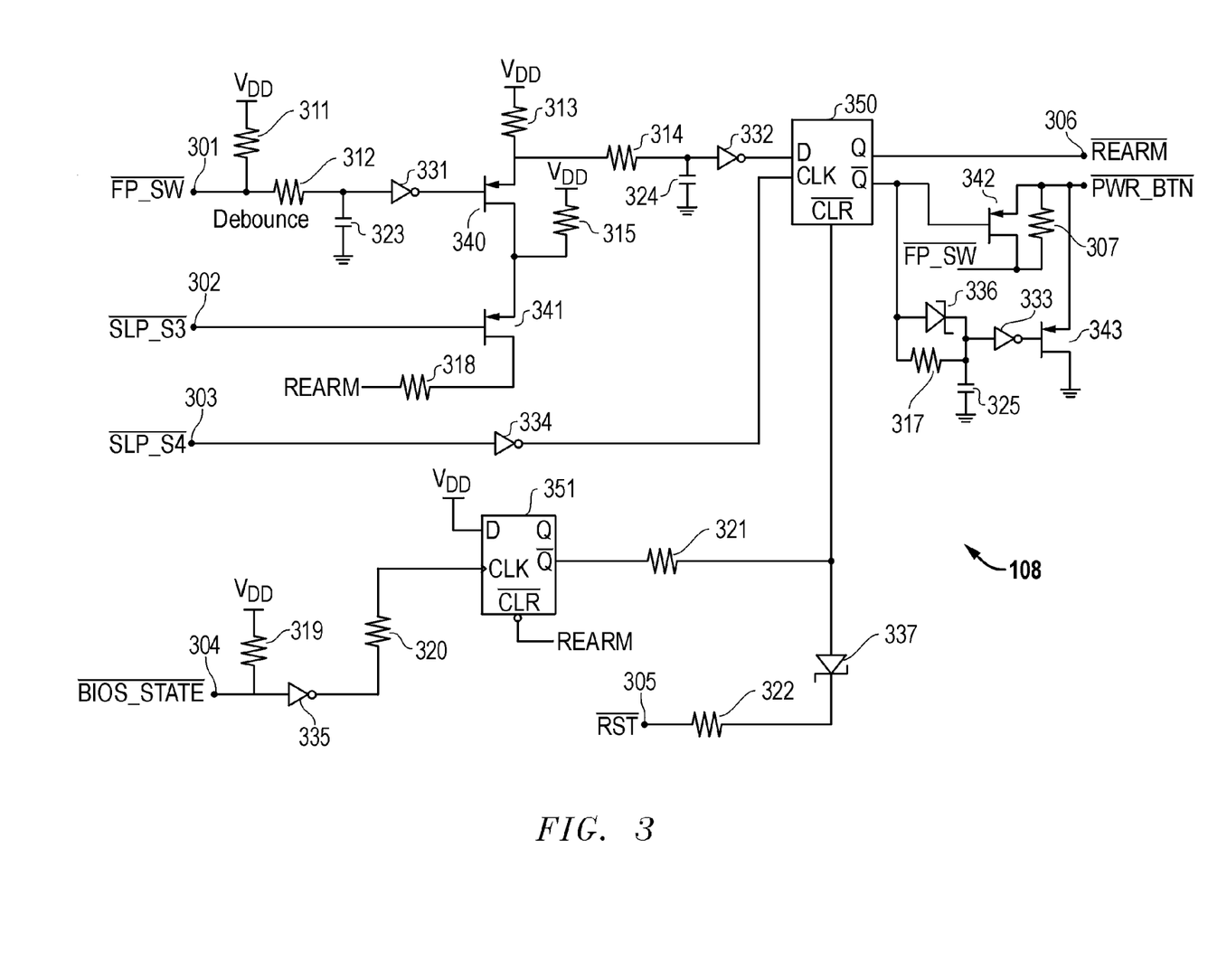
FIG. 3 illustrates a circuit diagram illustrating an example implementation of the restart controller of FIG. 1 according to one aspect of the disclosure.

FIG. 3 illustrates a circuit implementation of the restart controller 106 of FIG. 1 in accordance with at least one embodiment of the present disclosure. In the depicted example, the restart controller 106 includes input node 301 to receive an inverted representation of the FP_SW signal 130 (identified as $\overline{FP\_SW}$), an input node 302 to receive one signal of the ACPI_STATE signals 120 (identified as $\overline{SLP\_S3}$), an input node 303 to receive another signal of the ACPI_STATE signals 120 (identified as $\overline{SLP\_S4}$), an input node 304 to receive an inverted representation of the BIOS_STATE signal 132 (identified as $\overline{BIOS\_STATE}$), an input node 305 to receive an inverted representation of the RST signal 133 (identified as $\overline{RST}$), an output node 306 to provide the REARM signal 122, and an output node 307 to provide an inverted representation of the PWR_BTN signal 128 (identified as $\overline{PWR\_BTN}$). The signals $\overline{SLP\_S3}$ and $\overline{SLP\_S4}$ of the ACPI_STATE signals 120 identify which ACPI state the information handling system 100 is currently in. The restart controller 106 further includes resistors 311, 312-322, capacitors 323-325, inverters 331-335, diodes 336 and 337, transistors 340-343, and D-type flop latches 350 and 351 connected as illustrated in FIG. 3.

In the depicted implementation, the initial conditions of the restart controller 106 are set through diode 337 by the RST signal 133 during the initial power on of the restart controller 106 that occurs when AC power is supplied to the information handling system 100 From this initial configuration, the illustrated circuit detects a disorderly shutdown (block 204, FIG. 2) by relying on specific timing requirements of the ACPI_STATE signals 120. During an orderly shutdown process, the $\overline{SLP\_S3}$ signal will assert a guaranteed minimum amount of time before the $\overline{SLP\_S4}$ signal. In contrast, during a disorderly shutdown the $\overline{SLP\_S4}$ signal asserts anytime before or simultaneously with the $\overline{SLP\_S3}$ signal. The restart controller 106 exploits this difference in timing to detect a disorderly shutdown. When the disorderly shutdown timing sequence described occurs and the FP_SW signal 130 is in an asserted state, the latch 350 is loaded with the inverse value of the REARM signal 122. This new value stored in the latch 350 becomes the value of the REARM signal 122. The reliance on the value of the REARM signal 122 is what ensures that only the first disorderly shutdown is latched. In an alternate implementation, the FP_SW signal 130 could be disregarded to allow the restart controller 106 to handle disorderly shutdowns caused by stimulus other than the assertion of the PWR_BTN signal 128. When the sequence of events described results in the value of the latch 350 being set, the inverting output of the latch 350 results in the disconnection of FP_SW signal 130 from the PWR_BTN signal 128 by turning off transistor 342. The result of turning off transistor 342 is that the PWR_BTN signal 128 connected to the chipset 104 becomes cleared or deasserted as if the power button 108 had been released. Simultaneously with disconnecting FP_SW signal 130 from PWR_BTN signal 128, the inverting output of the latch 350 also initiates a resistor-capacitor time-constant delay resistor 317 and capacitor 325, which eventually reaches the input threshold of inverting buffer 333 and thereby resulting in the turning on of transistor 343.

Transistor 343 asserts PWR_BTN signal 128 after the described resistor-capacitor time delay has expired. The result of the difference in timing between immediately disconnecting FP_SW signal 130 from PWR_BTN signal 128 and the delayed timing of reasserting PWR_BTN signal 128 through transistor 343 results in a pulsed deassertion of PWR_BTN signal 128 to the chipset 104. This pulsed deassertion is interpreted by the logic of chipset 104 to be a release of the power button 108, which results in the chipset 104 performing an orderly power on operation as if a user had manually turned the information handling system 100 back on following the disorderly shutdown. Additionally, during the pulsed deassertion of PWR_BTN signal 128 the FP_SW signal 130 remains disconnected from the PWR_BTN signal 128, thereby preventing the user from interrupting the pulsed deassertion of the PWR_BTN signal 128 through manipulation of the power button 108.

After the chipset 104 has initiated the orderly power on event through normal means the BIOS 116 begins to execute. One step in the BIOS 116 execution is to set the BIOS_STATE signal 304 to indicate to the restart controller 106 that the BIOS 116 is operating normally. The negative-going edge of the assertion of the BIOS_STATE signal 132 propagates through inverting buffer 335 which results in the setting of the latch 351. When the latch 351 becomes set, the inverting output of the latch 351 asynchronously clears the latch 350. The clearing of the latch 350 also propagates through its non-inverting output to the REARM signal 122, which results in the clearing of the latch 351. The clearing of the latch 351 also propagates through its inverting output to deassert the asynchronous clear of the latch 350. Simultaneously with the clearing of the latch 350, the inverting output turns on transistor 342, thus reconnecting the FP_SW signal 130 to the PWR_BTN signal 128. The inverting output also turns off transistor 343 through diode 336 and inverting buffer 333, thereby resulting in the deassertion of the PWR_BTN signal 128. This sequence of events initiated by BIOS_STATE signal 132 results in the resetting of the restart controller 106 back to initial conditions and enables the reset controller 106 to respond to a future disorderly shutdown.

Alternatively, when the chipset 104 initiated the orderly power on operation described above, there is a possibility that some system failure may inhibit proper operation of the system BIOS 116, thus preventing the BIOS 116 from asserting the BIOS_STATE signal 132. In this event, the transistor 343 remains on, thereby causing the continued assertion of the PWR_BTN signal 128. After a minimum specified time the chipset 104 will respond to the continued assertion of PWR_BTN signal 128 by initiating a second disorderly shutdown that will not be latched in the manner described above because the state of the REARM signal 122 results in the clearing of latch 350. This configuration leaves the information handling system 100 in the off state and the restart controller 106 in the initial condition state. The clearing of the latch 350 also results in the reconnection of the FP_SW signal 130 to the PWR_BTN signal 128 through the transistor 342 as described above.

Figure 4:
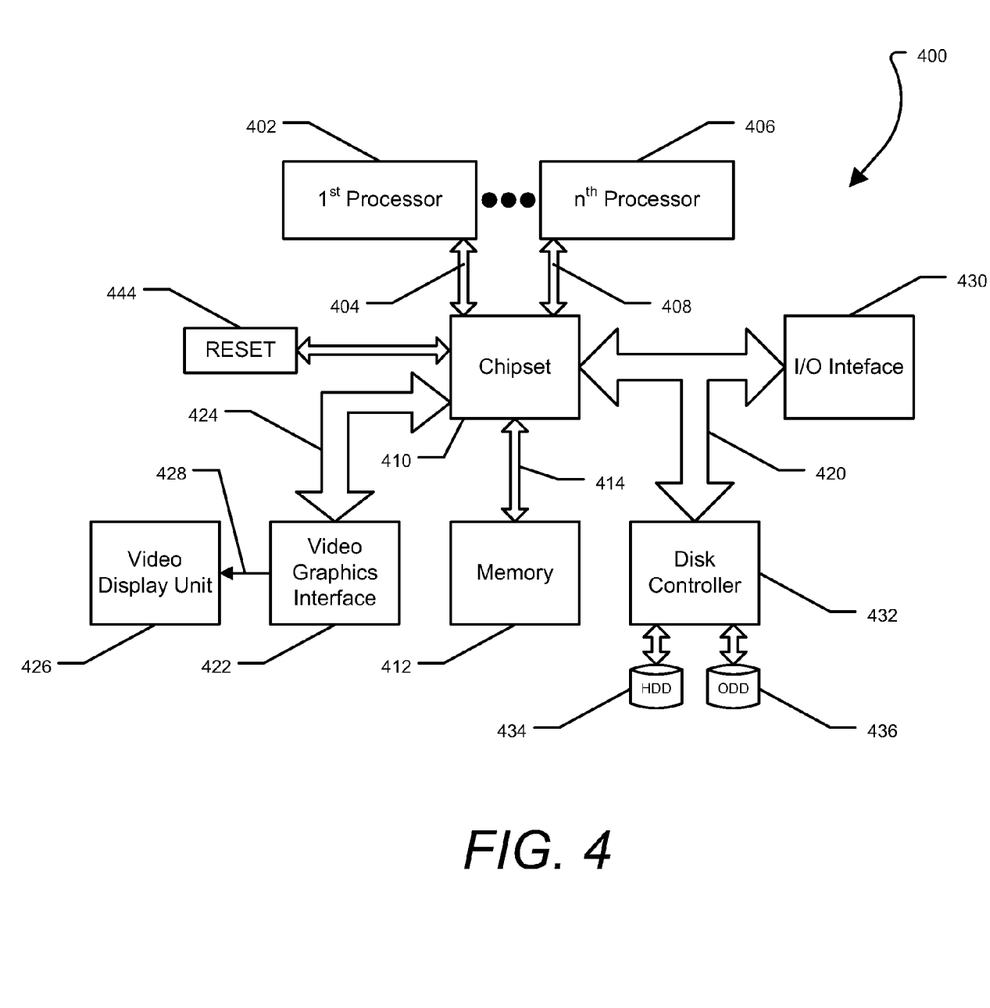
FIG. 4 illustrates a block diagram of a more detailed example of an information handling system according to one aspect of the disclosure.

FIG. 4 illustrates a block diagram of another example information handling system 400 in accordance with at least one embodiment of the present disclosure. In one form, the information handling system 400 can be a computer system such as a desktop computer or notebook computer. As shown in FIG. 4, the information handling system 400 can include a first physical processor 402 coupled to a first host bus 404 and can further include additional processors generally designated as $n^{th}$ physical processor 406 coupled to a second host bus 408. The first physical processor 402 can be coupled to a chipset 410 via the first host bus 404. Further, the $n^{th}$ physical processor 406 can be coupled to the chipset 410 via the second host bus 408. The chipset 410 can support multiple processors and can allow for simultaneous processing of multiple processors and support the exchange of information within information handling system 400 during multiple processing operations. The information handling system 400 further implements a reset control mechanism 444 implementing the restart controller 106 and power button 108 (FIG. 1) as described above.

According to one aspect, the chipset 410 can include a memory controller hub and an input/output (I/O) controller hub. As a memory controller hub, the chipset 410 can function to provide access to first physical processor 402 using first bus 404 and $n^{th}$ physical processor 406 using the second host bus 408. The chipset 410 can also provide a memory interface for accessing memory 412 using a memory bus 414. In a particular embodiment, the buses 404, 408, and 414 can be individual buses or part of the same bus. The chipset 410 can also provide bus control and can handle transfers between the buses 404, 408, and 414.

According to another aspect, the chipset 410 can be generally considered an application specific chipset that provides connectivity to various buses, and integrates other system functions. For example, the chipset 410 can be provided using an Intel® Hub Architecture (IHA) chipset that can also include two parts, a Graphics and Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 410. The chipset 410 can also be packaged as an application specific integrated circuit (ASIC).

The information handling system 400 can also include a video graphics interface 422 that can be coupled to the chipset 410 using a third host bus 424. In one form, the video graphics interface 422 can be an Accelerated Graphics Port (AGP) interface to display content within a video display unit 426. Other graphics interfaces may also be used. The video graphics interface 422 can provide a video display output 428 to the video display unit 426. The video display unit 426 can include one or more types of video displays such as a flat panel display (FPD) or other type of display device.

The information handling system 400 can also include an I/O interface 430 that can be connected via an I/O bus 420 to the chipset 410. The I/O interface 430 and I/O bus 420 can include industry standard buses or proprietary buses and respective interfaces or controllers.

In an alternate embodiment, the chipset 410 can be a chipset employing a northbridge/southbridge chipset configuration (not illustrated). For example, a northbridge portion of the chipset 410 can communicate with the first physical processor 402 and can control interaction with the memory 412, the I/O bus 420 that can be operable as a PCI bus, and activities for the video graphics interface 422. The northbridge portion can also communicate with the first physical processor 402 using first bus 404 and the second bus 408 coupled to the $n^{th}$ physical processor 406. The chipset 410 can also include a southbridge portion (not illustrated) of the chipset 410 and can handle I/O functions of the chipset 410. The southbridge portion can manage the basic forms of I/O such as Universal Serial Bus (USB), serial I/O, audio outputs, Integrated Drive Electronics (IDE), and ISA I/O for the information handling system 400.

The information handling system 400 can further include a disk controller 432 coupled to the I/O bus 420, and connecting one or more internal disk drives such as a hard disk drive (HDD) 434 and an optical disk drive (ODD) 436 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A restart controller for an information handling system, the restart controller comprising:
    a first latch; and
    a second latch, wherein an output of the second latch is coupled to an input of the first latch;
    wherein the restart controller is configured to:
        detect that the information handling system has been shut down responsive to a first disorderly shutdown; and
        in response to detecting that the information handling system was shut down, to:
            set the first latch;
            initiate a first startup of the information handling system to enable a remote wake mechanism of a chipset of the information handling system; and
            determine, at the second latch, that a basic input/output system (BIOS) of the information handling system is operational; and in response to determining that the BIOS is operational, to:
    initiate an orderly shutdown of the information handling system; and
    clear the first latch.

2. The restart controller of claim 1, wherein the restart controller is further configured to:
    determine, at the second latch, that the BIOS is non-operational in response to initiating the first startup of the information handling system; and
    initiate a second disorderly shutdown of the information handling system in response to determining that the BIOS is non-operational.

3. The restart controller of claim 2, wherein the restart controller is further configured to:
    determine that the BIOS is non-operational based on a state of a control signal for a light emitting diode of the information handling system.

4. The restart controller of claim 1, further comprising:
    a power button configured to initiate the first disorderly shutdown of the information handling system; and
    wherein the restart controller is further configured to disable the power button before the first startup of the information handling system.

5. The restart controller of claim 4, wherein, in further response to determining that the BIOS is operational, the restart controller is further configured to:
    enable the power button.

6. The restart controller of claim 1, wherein:
    the first latch is configured to provide a disorderly shutdown flag to indicate the first disorderly shutdown;
    the chipset is configured to initiate execution of the BIOS by a central processing unit responsive to the first latch providing the disorderly shutdown flag to the chipset to initiate the first startup the information handling system; and
    the BIOS is configured to manipulate the central processing unit to set a power management event flag responsive to the disorderly shutdown flag being set.

7. The restart controller of claim 1, wherein the restart controller is further configured to:
    detect the first disorderly shutdown based on power management signaling provided from the chipset.

8. The restart controller of claim 7, wherein the power management signaling comprises Advanced Configuration and Power Interface (ACPI) state signaling.

9. The restart controller of claim 8, wherein the ACPI state signaling comprises one or more of a sleep-S3 signal and a sleep-S4 signal.

10. The restart controller of claim 1, wherein in response to enabling the remote wake mechanism, the chipset is configured to initiate a second startup of the information handling system responsive to receiving a remote wake stimulus at the information handling system after the orderly shutdown of the information handling system following a previous disorderly shutdown.

11. A non-transitory computer-readable medium including code for performing a method, the method comprising:
    detecting, at a restart controller, that an information handling system has been shut down responsive to a first disorderly shutdown;
    in response to detecting that the information handling system was shut down:
        setting a latch to provide a disorderly shutdown flag;
        initiating a first startup of the information handling system to restore a system configuration setting by initiating execution of a basic input/output system (BIOS) of the information handling system; and
        determining that the BIOS is operational;
    in response to determining that the BIOS is operational:
        initiating an orderly shutdown of the information handling system; and
        clearing the latch.

12. The computer-readable medium of claim 11, the method further comprising;
    determining that the BIOS is non-operational in response to initiating the first startup of the information handling system; and
    initiating a second disorderly shutdown of the information handling system in response to determining that the BIOS is non-operational.

13. The computer-readable medium of claim 12, the method further comprising:
    determining that the BIOS is non-operational based on a state of a control signal for a light emitting diode of the information handling system.

14. The computer-readable medium of claim 11, the method further comprising:
    disabling a power button before the first startup of the information handling system, wherein the power button is configured to initiate the first disorderly shutdown of the information handling system.

15. The computer-readable medium of claim 14, wherein, in further response to determining that the BIOS is operational, the method further comprises:
    enabling the power button.

16. The computer-readable medium of claim 11, wherein:
    the latch is configured to provide a disorderly shutdown flag to indicate the first disorderly shutdown;
    the chipset is configured to initiate execution of the BIOS by a central processing unit responsive to the first latch providing the disorderly shutdown flag to the chipset to initiate the first startup the information handling system; and
    the BIOS is configured to manipulate the central processing unit to set a power management event flag responsive to the disorderly shutdown flag being set.

17. The computer-readable medium of claim 11, the method further comprising:
    detecting the first disorderly shutdown based on power management signaling provided from the chipset.

18. The computer-readable medium of claim 17, wherein the power management signaling comprises Advanced Configuration and Power Interface (ACPI) state signaling.

19. The computer-readable medium of claim 18, wherein the ACPI state signaling comprises one or more of a sleep-S3 signal and a sleep-S4 signal.

20. The computer-readable medium of claim 11, the method further comprising:
    initiating a second startup the information handling system responsive to receiving a remote wake stimulus at the information handling system after the orderly shutdown of the information handling system.

* * * * *